United States Patent
Quievryn et al.

(10) Patent No.: US 10,235,274 B1
(45) Date of Patent: Mar. 19, 2019

(54) PERFORMING AN ACTION DURING PROGRAM EXECUTION BASED ON A DYNAMIC CONDITION

(71) Applicant: The MathWorks, Inc., Natick, MA (US)

(72) Inventors: George Quievryn, Stow, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 205 days.

(21) Appl. No.: 15/342,887

(22) Filed: Nov. 3, 2016

(51) Int. Cl.
*G06F 11/00* (2006.01)
*G06F 11/36* (2006.01)

(52) U.S. Cl.
CPC ...... *G06F 11/3644* (2013.01); *G06F 11/3664* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,349,539 A * | 9/1994 | Moriyasu | ............ | G06F 17/5036 702/117 |
| 6,493,863 B1 * | 12/2002 | Hamada | ............... | G06F 17/5045 716/102 |
| 7,774,172 B1 * | 8/2010 | Yunt | ........................ | G06F 8/34 703/2 |
| 8,136,096 B1 * | 3/2012 | Lindahl | ............... | G06F 11/3636 714/45 |
| 2003/0028862 A1 * | 2/2003 | Bates | .................... | G06F 11/362 717/129 |
| 2005/0289396 A1 * | 12/2005 | Hooper | ............... | G06F 11/3664 714/34 |
| 2011/0289301 A1 * | 11/2011 | Allen | .................. | G06F 11/3636 712/227 |
| 2012/0246622 A1 * | 9/2012 | Puthuff | ............... | G06F 11/3636 717/127 |
| 2014/0337822 A1 * | 11/2014 | Puthuff | ............... | G06F 11/3636 717/125 |

(Continued)

OTHER PUBLICATIONS

Wikipedia, "Breakpoint," https://en.wikipedia.org/wiki/Breakpoint, Apr. 21, 2016, 4 pages.

(Continued)

*Primary Examiner* — Amine Riad
(74) *Attorney, Agent, or Firm* — Harrity & Harrity, LLP

(57) ABSTRACT

A device may determine one or more conditional parameters associated with determining whether a condition is satisfied during execution of a program. The one or more conditional parameters may vary over time. The device may execute the program to generate one or more execution parameters corresponding to the one or more conditional parameters. The device may compare the one or more execution parameters and the one or more conditional parameters. The device may determine that the condition is satisfied based on comparing the one or more execution parameters and the one or more conditional parameters. The device may perform an action, in association with the program, based on determining that the condition is satisfied.

21 Claims, 8 Drawing Sheets

(56) References Cited

U.S. PATENT DOCUMENTS

2015/0301806 A1  10/2015  Leon et al.
2018/0089061 A1* 3/2018  Cook .................... G06F 11/362

OTHER PUBLICATIONS

Co-pending U.S. Appl. No. 14/745,918, entitled "Linking Program Code and Test Code for Testing the Program Code", by Campbell et al., filed Jun. 22, 2015, 68 pages.
Co-pending U.S. Appl. No. 14/633,956, entitled "Tentative Model Components", by Bienkowski et al., filed Feb. 27, 2015, 49 pages.

* cited by examiner

PERFORMING AN ACTION DURING PROGRAM EXECUTION BASED ON A DYNAMIC CONDITION

DETAILED DESCRIPTION

The following detailed description of example implementations refers to the accompanying drawings. The same reference numbers in different drawings may identify the same or similar elements.

A user may use a device to test a program (e.g., a program that includes program code, a program that includes a model or code for executing and/or simulating a model, and/or a program that is based on a model). In some cases, the user may wish to intentionally stop or pause execution of the program during execution or testing (e.g., to debug or to step through the program operations or lines of program code one at a time). In some implementations, to stop or pause execution, the user may use an instruction breakpoint, where, for example, execution of the program is interrupted prior to execution of a user-specified instruction (e.g., prior to execution of a particular line of program code). Additionally, or alternatively, the user may use a conditional breakpoint, where, for example, execution is interrupted based on a static threshold value (e.g., which may interrupt execution when a value of a variable, a signal value, a state or state value, data, etc. equals the threshold value or when the value exceeds a threshold value). In some cases, the user may wish to interrupt execution using a breakpoint other than an instruction breakpoint and/or a conditional breakpoint.

Implementations described herein enable a user and a device to use a dynamic conditional breakpoint to interrupt execution of a program or a model. This may enable the user device to interrupt execution based on a dynamic condition that varies in a time domain or a frequency domain. This improves the use of breakpoints during testing of the program or the model by providing the user with increased flexibility and control over the interruption of execution of the program or the model (e.g., by providing input that specifies a condition that interrupts execution when satisfied).

Figure 1A:
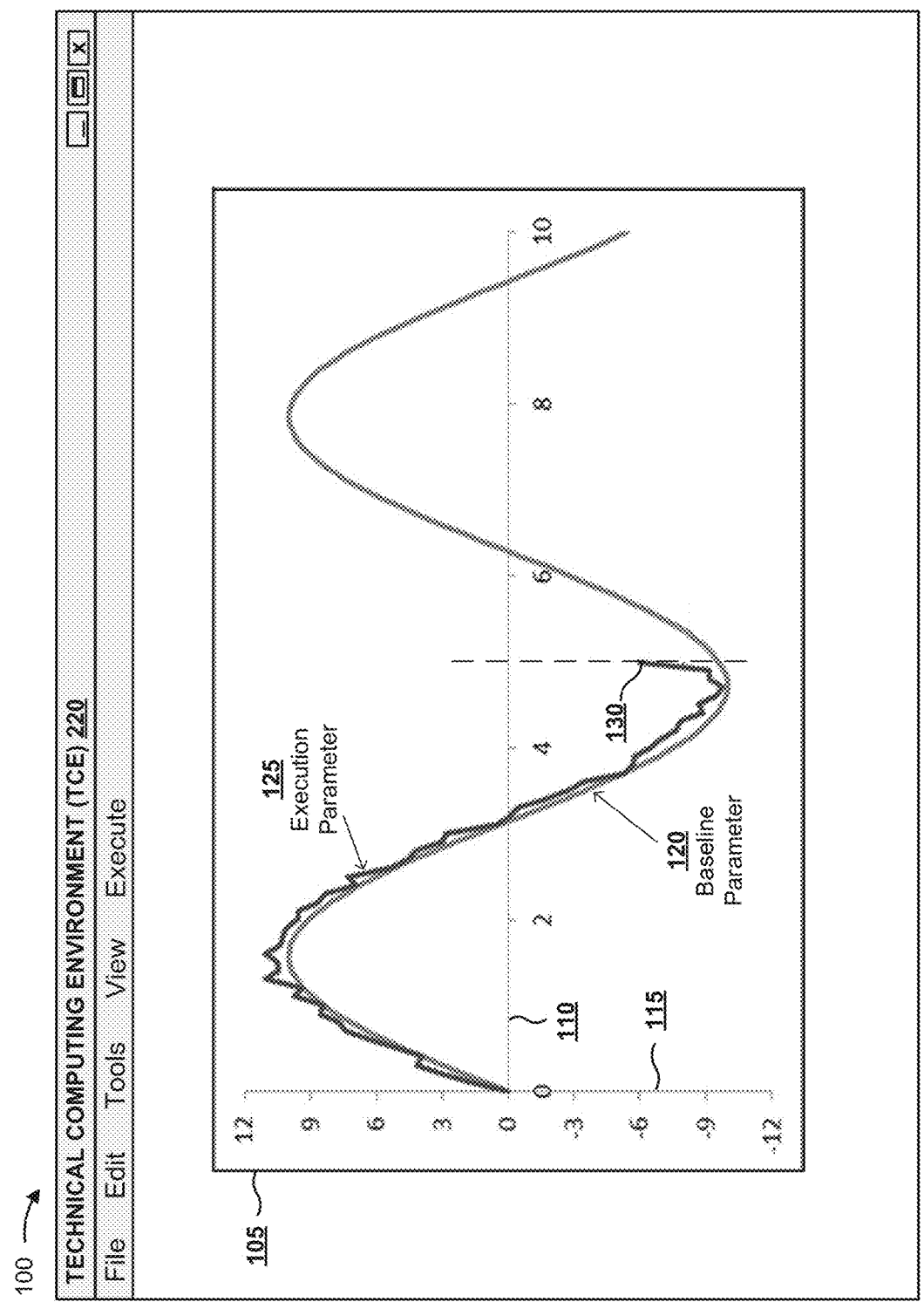
FIGS. 1A-1E are diagrams of an overview of an example implementation described herein.

FIGS. 1A-1E are diagrams of an overview of an example implementation 100 described herein. As shown in FIG. 1A, a technical computing environment (TCE) 220 may display a user interface (UI) 105. In some implementations, UI 105 may display a first graphical representation associated with execution of a program. In some implementations, the first graphical representation may include a first axis 110 (e.g., a time axis or a frequency axis). Additionally, or alternatively, the first graphical representation may include a second axis 115 (e.g., a value axis). Assume for FIGS. 1A-1E that first axis 110 is a time axis and that second axis 115 is a value axis.

In some implementations, TCE 220 may use the first graphical representation to display a visual representation of a value of a parameter in a time domain or a frequency domain. For example, the first graphical representation may include a visual representation of a baseline parameter 120, such as a previously recorded output from execution of a program, a previously recorded baseline value of a variable, data input by a user, or output from a different program or a different version of the program. As another example, the first graphical representation may include a visual representation of an execution parameter 125 (e.g., an output from execution of a program or a value of a variable during execution of the program). In some implementations, the user may select baseline parameter 120 and/or execution parameter 125 via interaction with TCE 220.

In some implementations, TCE 220 may compare baseline parameter 120 and execution parameter 125 (e.g., automatically during execution or based on a user interaction with TCE 220). For example, TCE 220 may compare a value (e.g., a numerical value) of baseline parameter 120 and a value of execution parameter 125. As another example, TCE 220 may compare sequences of events (e.g., execution events) identified by baseline parameter 120 and by execution parameter 125. As another example, TCE 220 may compare states (e.g., states of different programs or states of execution of particular portions of a program) identified by baseline parameter 120 and by execution parameter 125. As another example, TCE 220 may compare phases of a value (e.g., a value in a frequency domain) identified by baseline parameter 120 and by execution parameter 125. In some implementations, TCE 220 may compare baseline parameter 120 and execution parameter 125 to determine whether a condition is satisfied, as described below.

In some implementations, TCE 220 may compare baseline parameter 120 and execution parameter 125 in a time domain. Additionally, or alternatively, TCE 220 may compare baseline parameter 120 and execution parameter 125 in a frequency domain. In some implementations, TCE 220 may compare baseline parameter 120 and execution parameter 125 during execution (e.g. during run time of a program).

In some implementations, TCE 220 may process baseline parameter 120 and/or execution parameter 125 prior to performing the comparison. For example, TCE 220 may interpolate values of baseline parameter 120 and/or execution parameter 125 prior to performing the comparison. As another example, TCE 220 may shift values of baseline parameter 120 and/or execution parameter 125 in a time domain or a frequency domain prior to performing the comparison. For example, TCE 220 may shift a magnitude and/or phase of the baseline parameter based on an initial value of the execution parameter (e.g., to align the baseline parameter and the execution parameter).

As another example, TCE 220 may determine a correspondence between values of baseline parameter 120 and execution parameter 125 by using information that identifies a model block that generated the values, by using a signal identifier that identifies a signal associated with the values, or by using traceability information that is stored with different versions of a model. In some implementations, traceability information may associate a conditional parameter with a model element for which the conditional parameter was formulated. This enables TCE 220 to determine a correspondence and perform a comparison between baseline parameter 120 and execution parameter 125, such as when baseline parameter 120 and execution parameter 125 lack uniformly sampled values (e.g., when baseline parameter 120 and execution parameter 125 are not sampled at the same time or when it is otherwise difficult to determine a correspondence between baseline parameter 120 and execution parameter 125) thereby improving a comparison of baseline parameter 120 and execution parameter 125.

In some implementations, TCE 220 may determine whether a condition is satisfied based on comparing baseline parameter 120 and execution parameter 125, as described below. For example, TCE 220 may make this comparison after executing a line of code (e.g., in MATLAB or a similar type of computing environment), after executing a simulation step (e.g., a sample time step in Simulink, Stateflow, SimEvents, Simscape, or a similar type of computing environment), after executing a substep of a simulation step (e.g., after executing a step to compute output, after executing a step to update a state of a block, after executing a step to log data, etc.), after processing an event (e.g., after executing a scheduled discrete event, after executing a time-stamped discrete event, etc.), after processing a state transition (e.g., after executing an internal transition in a hierarchical state, after executing an external transition out of a state, after executing a super step of a state transition diagram, etc.), or the like. In some implementations, satisfaction of the condition may cause TCE 220 to perform an action based on the condition being satisfied. For example, satisfaction of the condition may cause TCE 220 to interrupt execution of the program and enable the user to debug the program using TCE 220. As another example, satisfaction of the condition may cause TCE 220 to interrupt execution of the program by a first set of processors and continue execution of the program by a second set of processors, thereby enabling the user to inspect and/or debug the program without completely interrupting execution of the program.

As another example, satisfaction of the condition may cause TCE 220 to interrupt execution of the program and permit the user to step forward and/or backward through operations of the program and/or lines of program code (e.g., step through one operation at a time, one line at a time, or two lines at a time), to step into and/or out of program modules (e.g., functions, procedures, messages, etc.), to run to the end of a program module, or the like. As additional examples, satisfaction of the condition may cause TCE 220 to log information indicating that the condition was satisfied; to display a message to the user indicating that the condition was satisfied; to transmit, to the user or another device, a message indicating that the condition was satisfied; and/or to prompt the user to indicate an action for TCE 220 to perform based on the condition being satisfied.

Assume, for example, that a condition is satisfied based on comparing baseline parameter 120 and execution parameter 125. For example, as shown by reference number 130, the condition may be satisfied at approximately a time period (e.g., indicated by 5) when the value of baseline parameter 120 is approximately −9 and the value of execution parameter 125 is approximately −6. Further assume, for example, that TCE 220 has paused execution based on a result of the condition being satisfied. Because TCE 220 uses a time-based conditional breakpoint, execution of a program may be interrupted when the value of execution parameter 125 is −5 at time period 5, but may not be interrupted when the value of execution parameter 125 is −5 at time period 4, because the value of baseline parameter 120 varies over time.

Figure 1B:
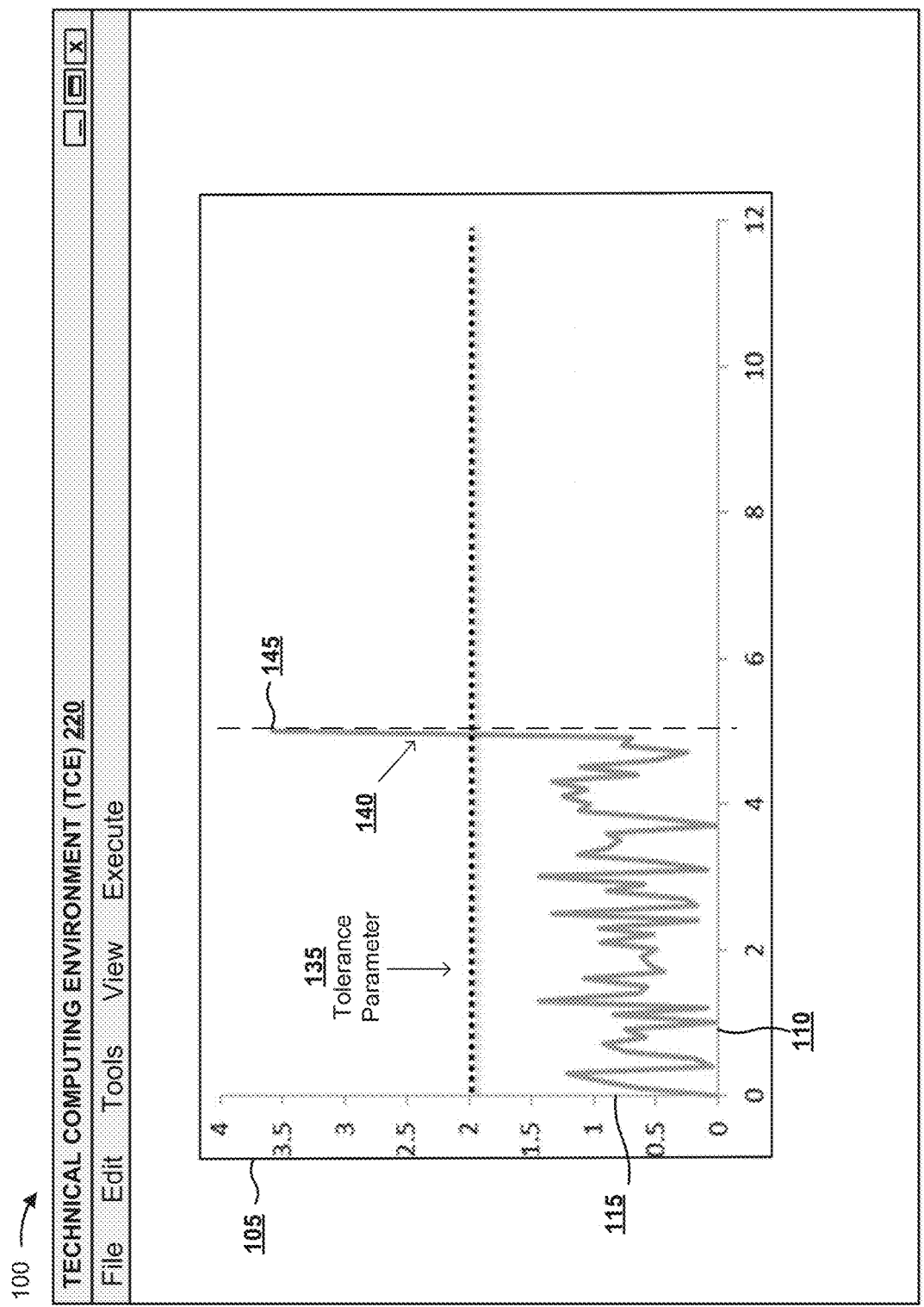

As shown in FIG. 1B, UI 105 may display a second graphical representation. In some implementations, the second graphical representation may display a visual representation of a tolerance parameter 135. In some implementations, tolerance parameter 135 may be associated with determining whether the condition is satisfied. For example, tolerance parameter 135 may represent a threshold value, an absolute threshold value, a threshold percent, an absolute threshold percent, or a threshold number of degrees for a phase shift.

In some implementations, tolerance parameter 135 may be a static parameter, where, for example, a value of tolerance parameter 135 does not change during execution (e.g., as shown in FIG. 1B). Additionally, or alternatively, tolerance parameter 135 may be a dynamic parameter, where, for example, a value of tolerance parameter 135 changes over time during execution (e.g., based on the value of baseline parameter 120). For example, tolerance parameter 135 may represent a tolerance, where the value of tolerance parameter 135 is a particular percentage of the value of baseline parameter 120. As another example, tolerance parameter 135 may represent a time-shifted tolerance, where different tolerances are associated with different time periods, or a frequency-shifted tolerance, where different tolerances are associated with different frequencies.

As further shown in FIG. 1B, the second graphical representation may display result 140 of comparing baseline parameter 120 and execution parameter 125. For example, the second graphical representation may display a difference or an absolute difference between baseline parameter 120 and execution parameter 125. As another example, the graphical representation may display a percent difference or an absolute percent difference between baseline parameter 120 and execution parameter 125. As another example, the second graphical representation may display a binary indication of whether baseline parameter 120 and execution parameter 125 match (e.g., that a condition is satisfied). Assume for FIG. 1B that tolerance parameter 135 and result 140 are associated with an absolute difference between baseline parameter 120 and execution parameter 125.

In some implementations, TCE 220 may determine whether the condition is satisfied by comparing tolerance parameter 135 and result 140. For example, as shown by reference number 145, TCE 220 may compare tolerance parameter 135 and result 140, and may determine that result 140 is greater than tolerance parameter 135 at time period 5, thereby satisfying the condition. In some implementations, TCE 220 may perform an action based on determining that the condition is satisfied, as described elsewhere herein.

Figure 1C:
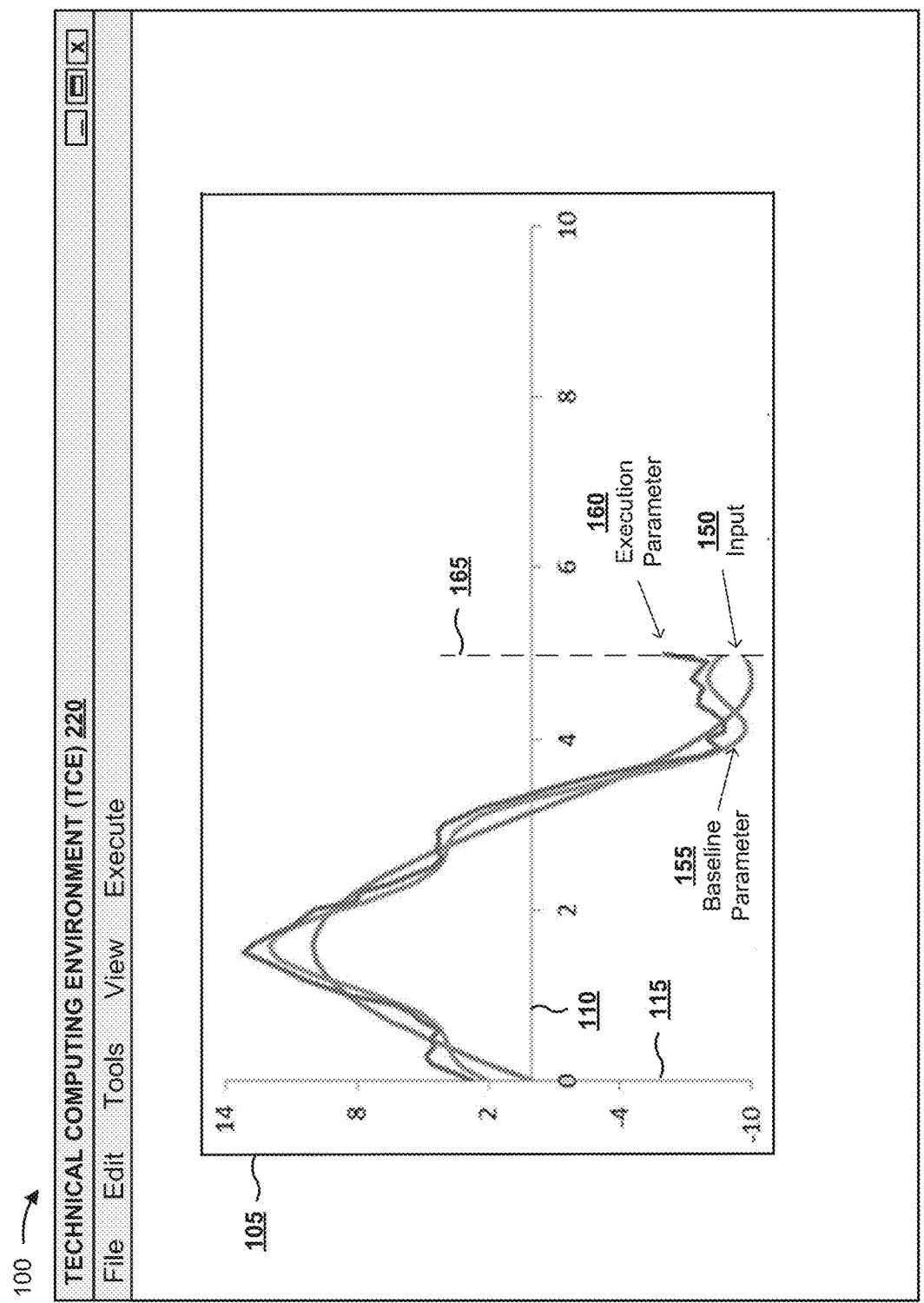

As shown in FIG. 1C, UI 105 may display a third graphical representation that displays a visual representation of input 150 (e.g., input from a user or output from a first program that is used as input to a second program). As further shown in FIG. 1C, the third graphical representation may display visual representations of baseline parameter 155 and/or execution parameter 160. In some implementations, rather than using a pre-defined or pre-recorded baseline parameter (e.g., as shown in FIG. 1A), TCE 220 may determine the baseline parameter 155 in real-time during execution of a program. For example, as the program executes, TCE 220 may use a value of input 150 at a particular time to calculate an expected output value at that time, which may be represented by baseline parameter 155. Additionally, or alternatively, as the program executes, TCE 220 may determine an actual output value of a program at that time, which may be represented by execution parameter 160. As an example, input 150 may include a time-varying input to a function, baseline parameter 155 may represent an expected output of the function, and execution parameter 160 may represent an actual output of the function when executed by the program.

As shown in FIG. 1C, in some implementations, TCE 220 may generate input 150 over time during execution of the program. As further shown, TCE 220 may generate baseline parameter 155 over time during execution (e.g., based on input 150). As further shown, TCE 220 may generate execution parameter 160 during execution using input 150. By determining input 150, baseline parameter 155, and/or execution parameter 160 during execution, TCE 220 may display and compare run-time output from multiple programs or from multiple portions of the same program, thereby increasing an efficiency of testing by reducing or eliminating the need to use a previously recoded baseline parameter 155.

In some implementations, TCE 220 may compare baseline parameter 155 and execution parameter 160 in a manner similar to that described with respect to FIGS. 1A and 1B. As further shown in FIG. 1C, and by reference number 165, TCE 220 may interrupt execution at a time period (e.g., indicated by 5) based on comparing baseline parameter 155 and execution parameter 160 (e.g., based on determining that the condition is satisfied). In some implementations, TCE 220 may perform one or more actions based on comparing baseline parameter 155 and execution parameter 160, as described elsewhere herein.

Figure 1D:
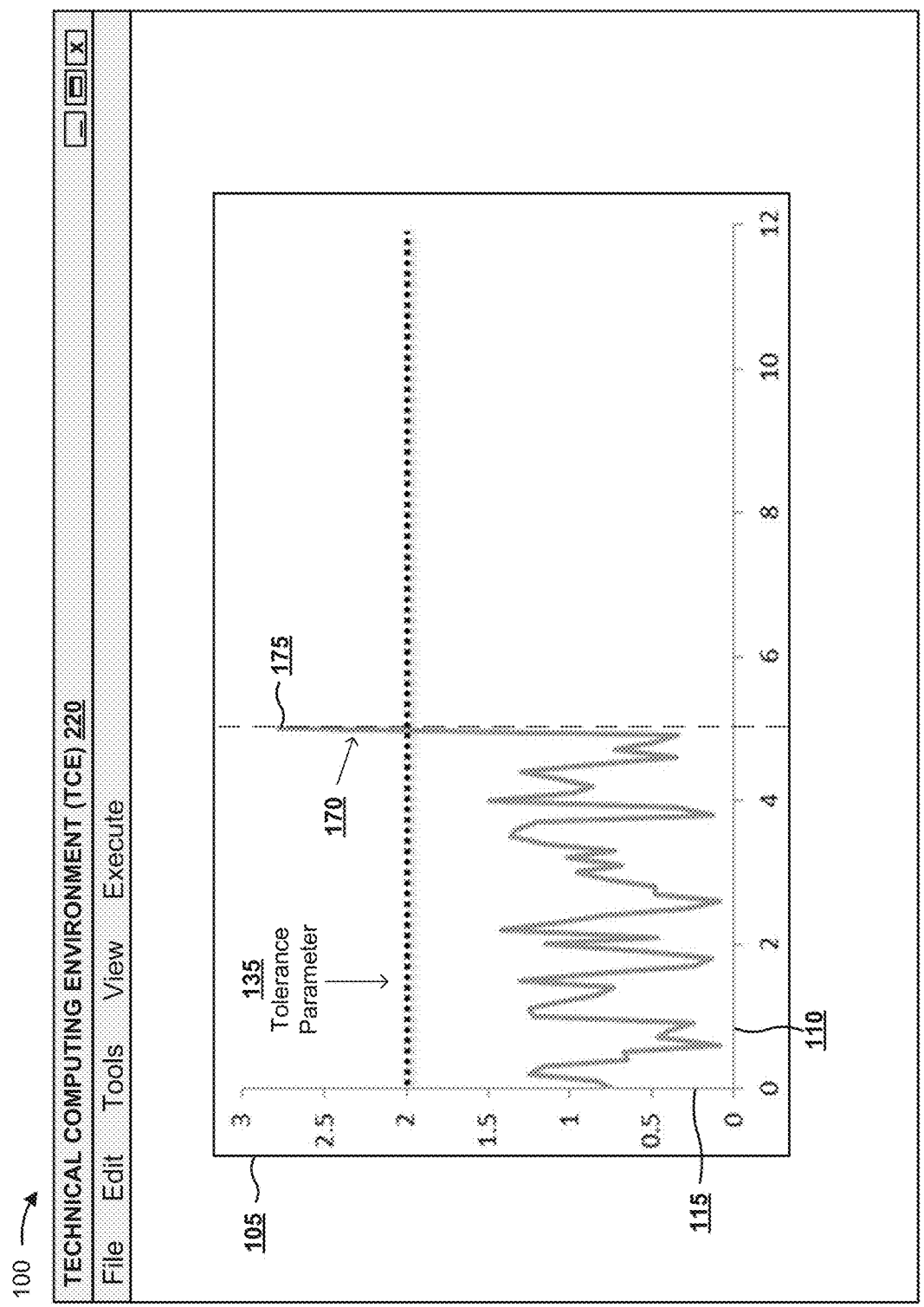

As shown in FIG. 1D, UI 105 may display a fourth graphical representation. In some implementations, the fourth graphical representation may display result 170 of a comparison of baseline parameter 155 and execution parameter 160 to determine whether the comparison satisfies tolerance parameter 135, in a similar manner as described with respect to FIG. 1B. In some implementations, TCE 220 may not display tolerance parameter 135 for all time periods shown in the graphical representation (e.g., for time periods zero to 12 in FIG. 1D). For example, when TCE 220 is generating baseline parameter 120 during execution and tolerance parameter 135 is based on baseline parameter 120, TCE 220 may not display tolerance parameter 135 beyond the time period when execution was interrupted because TCE 220 would not have generated values for baseline parameter 120 beyond that time period. In some implementations, TCE 220 may perform an action based on comparing baseline parameter 155 and execution parameter 160. For example, as shown by reference number 175, TCE 220 may interrupt execution (e.g., at approximately time period 5) based on the comparison of baseline parameter 155 and execution parameter 160.

Figure 1E:
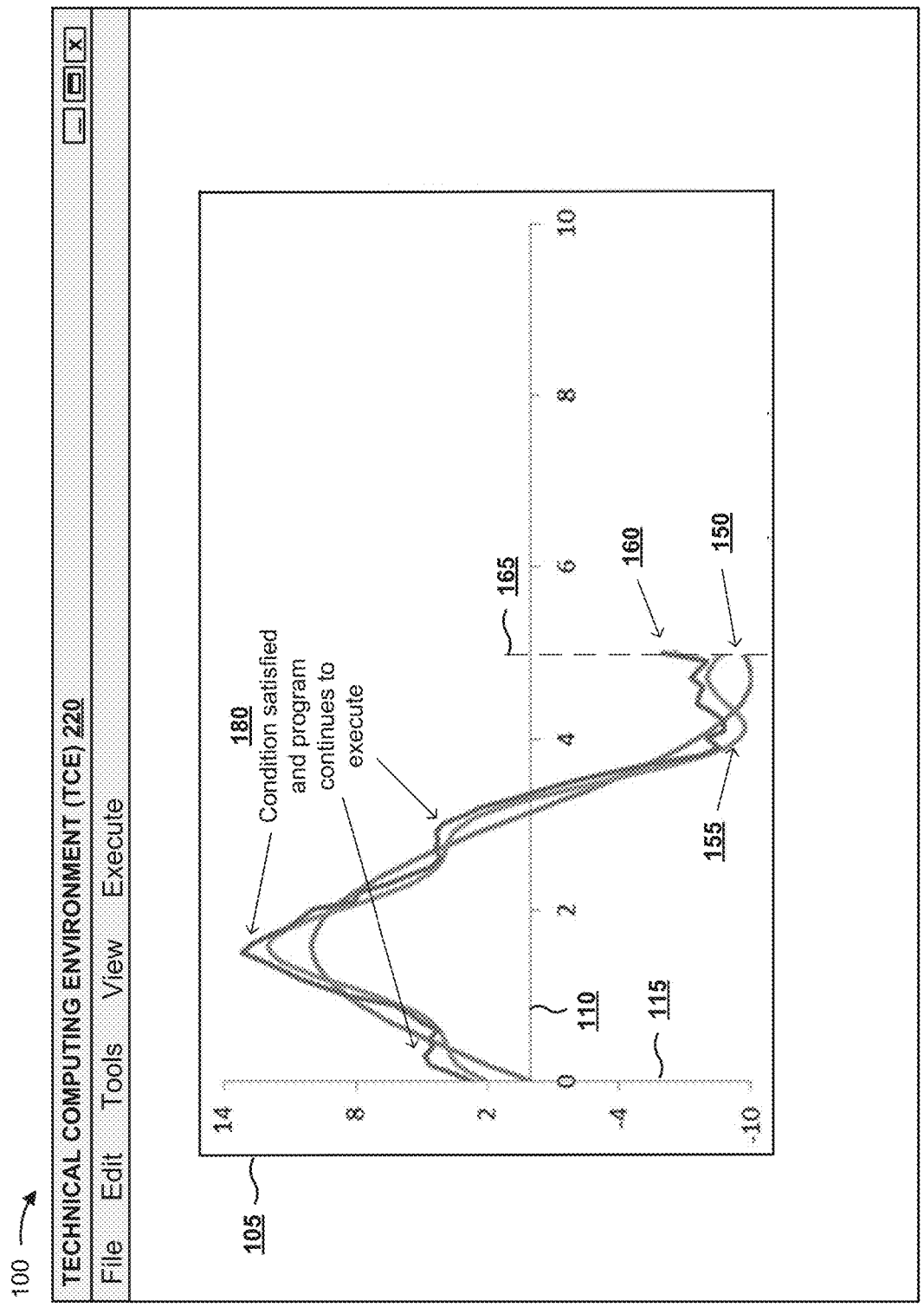

As shown in FIG. 1E, and by reference number 180, TCE 220 may continue execution despite the condition being satisfied. For example, TCE 220 may continue execution, or perform a first set of actions, when a first condition is satisfied (e.g., as shown by reference number 180). For example, TCE 220 may continue execution when a value is within a tolerance. As another example, TCE 220 may interrupt execution, or perform a second set of actions, when a second condition is satisfied. For example, TCE 220 may interrupt execution when a value is outside a tolerance. This enables TCE 220 to implement multiple dynamic breakpoints and/or a breakpoint that causes TCE 220 to selectively perform multiple actions, thereby improving testing by increasing flexibility and/or control associated with the testing.

In this way, a device may enable use of dynamic conditions (e.g., time-based conditional breakpoints or frequency-based conditional breakpoints) to trigger an action during execution of a program. This improves testing of the program by providing increased flexibility and/or control when defining conditions to trigger actions (e.g., relative to instructional breakpoints or conditional breakpoints).

Figure 2:
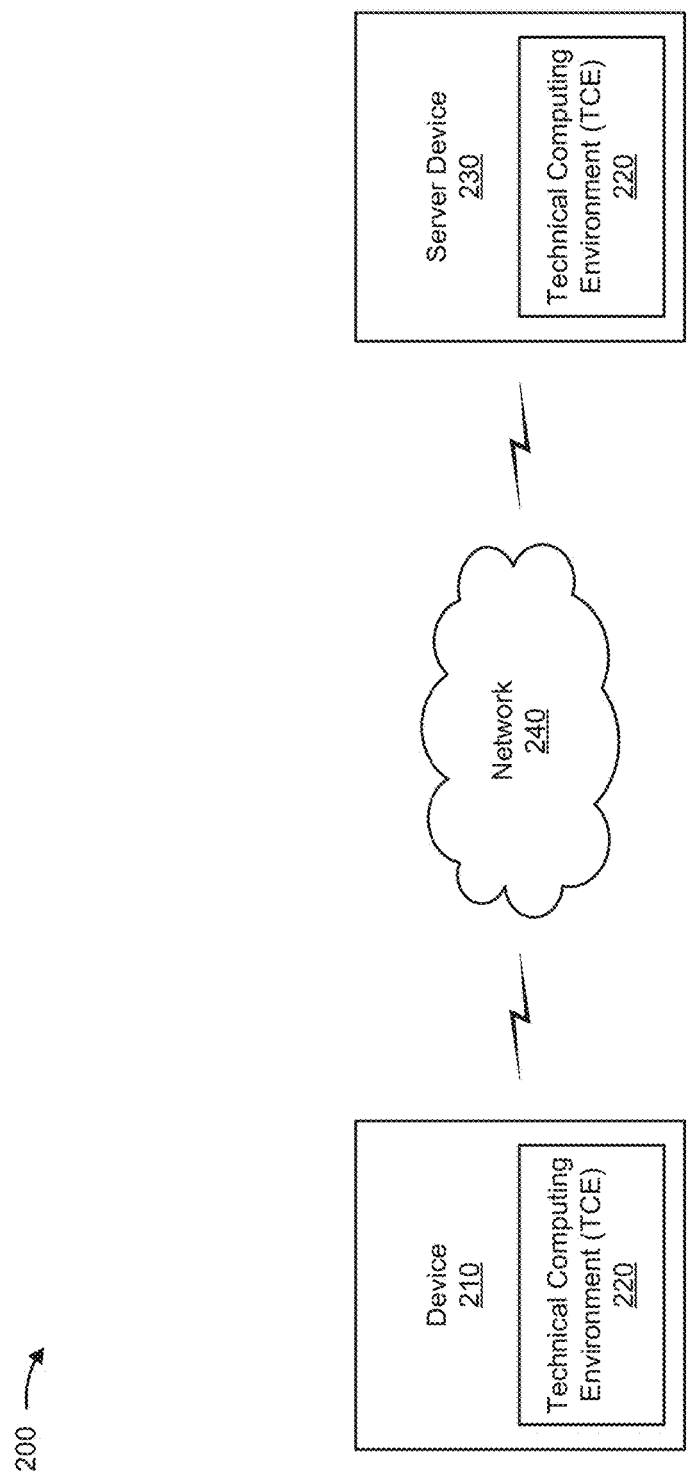
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a device 210, which may include TCE 220. Furthermore, environment 200 may include a server device 230, which may include TCE 220, and a network 240. Devices of environment 200 may interconnect via wired connections, wireless connections, or a combination of wired and wireless connections.

Device 210 includes one or more devices capable of receiving, generating, storing, processing, and/or providing information associated with a program (e.g., a model element, a block, an input signal, a portion of program code, a breakpoint, or the like). For example, device 210 may include a computing device, such as a desktop computer, a laptop computer, a tablet computer, a mobile phone (e.g., a smart phone or a radiotelephone), or a similar device. Device 210 may provide a graphical user interface (GUI) for viewing and/or interaction with a program and/or one or more features associated therewith, as described elsewhere herein. Additionally, or alternatively, device 210 may evaluate a program by, for example, executing the program, as described elsewhere herein. In some implementations, device 210 may receive information from and/or transmit information to server device 230.

Device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations. For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., X=2Y) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may include determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations X=2Y+U and Y=3X−2U may be symbolically processed into one equation 5Y=−U. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally specific or consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. In some implementations, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

TCE 220 may include, for example, a user interface that provides one or more graphical representations of data. For example, TCE 220 may provide one or more graphical representations of data generated by execution of a program or previously generated data that was imported into TCE 220. In some implementations, TCE 220 may permit a user to interact with TCE 220 to define one or more breakpoints associated with execution of a program or a model.

Server device 230 includes one or more devices capable of receiving, generating, storing, processing, and/or providing a program and/or information associated therewith. For example, server device 230 may include a computing device, such as a server, a desktop computer, a laptop computer, a tablet computer, or a similar device. In some implementations, server device 230 may host TCE 220. In some implementations, device 210 may be used to access one or more TCEs 220 running on one or more server devices 230. For example, multiple server devices 230 may be used to execute a program (e.g., serially or in parallel), and may provide respective results of executing the program to device 210.

In some implementations, device 210 and server device 230 may be owned by different entities. For example, an end user may own device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by device 210.

Network 240 includes one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
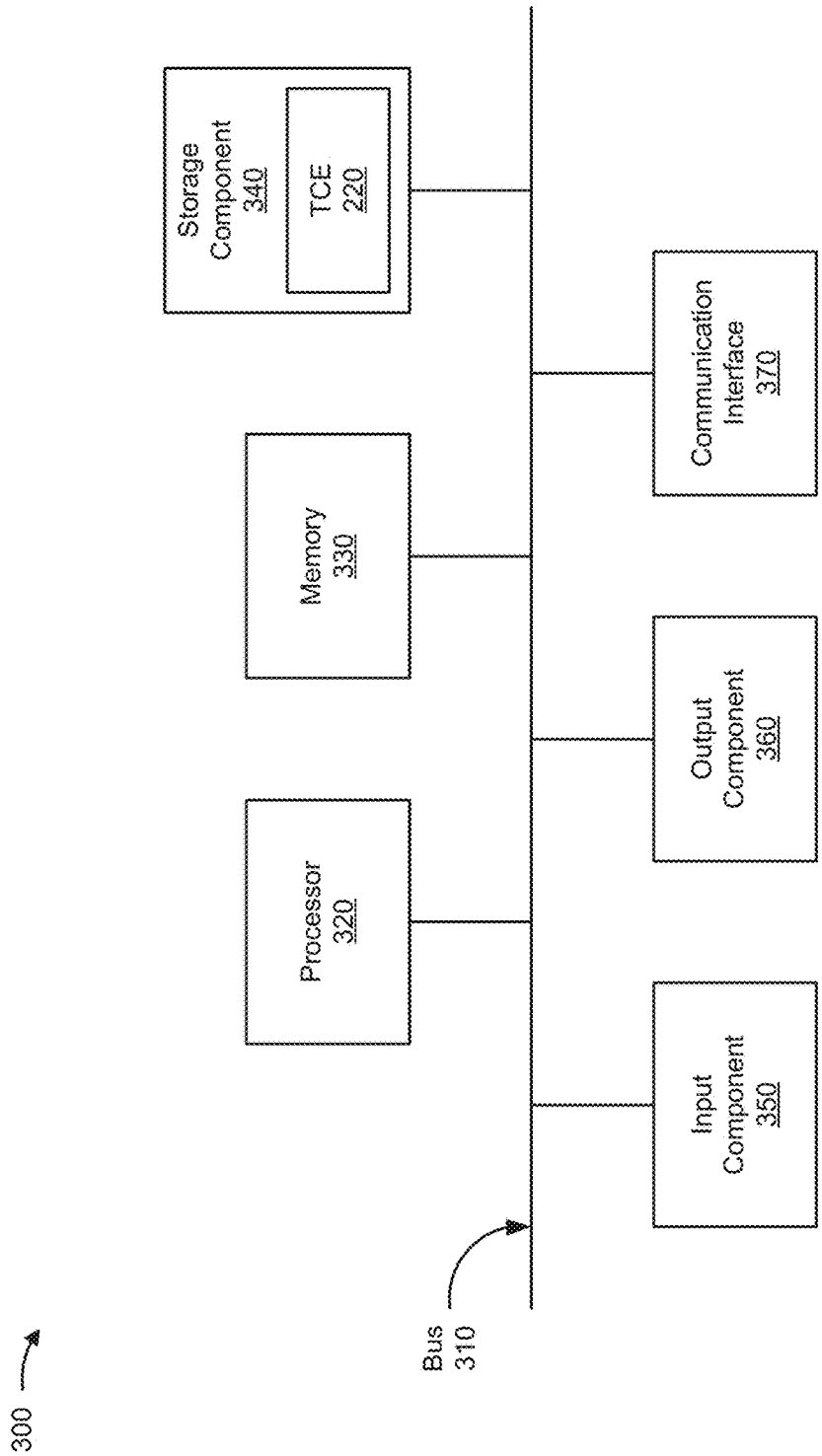
FIG. 3 is a diagram of example components of one or more devices of FIG. 2.

FIG. 3 is a diagram of example components of a device 300. Device 300 may correspond to device 210 and/or server device 230. In some implementations, device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
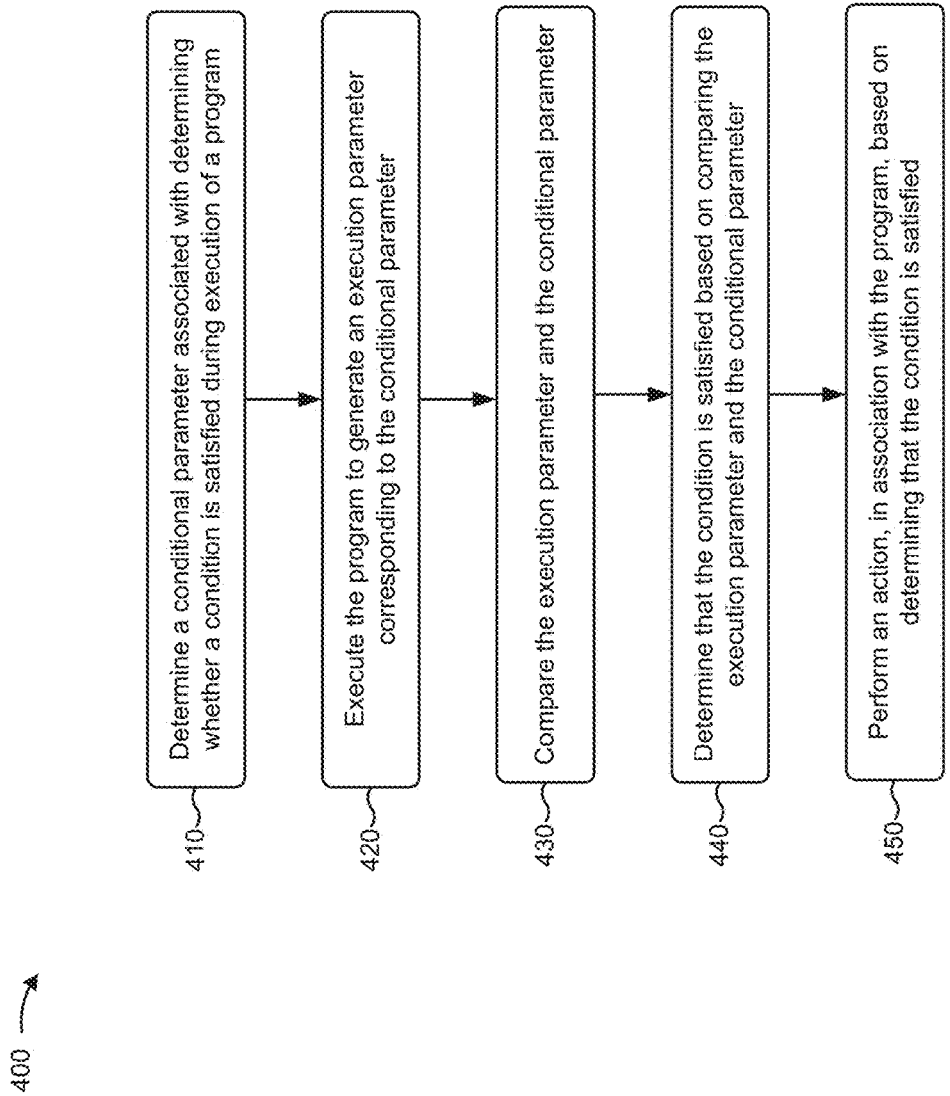
FIG. 4 is a flow chart of an example process for performing an action during program execution based on a dynamic condition.

FIG. 4 is a flow chart of an example process 400 for performing an action during program execution based on a dynamic condition. In some implementations, one or more process blocks of FIG. 4 may be performed by device 210. In some implementations, one or more process blocks of FIG. 4 may be performed by another device or a group of devices separate from or including device 210, such as server device 230.

As shown in FIG. 4, process 400 may include determining a conditional parameter associated with determining whether a condition is satisfied during execution of a program (block 410) and executing the program to generate an execution parameter corresponding to the conditional parameter (block 420). For example, device 210 may determine a conditional parameter that changes over time (e.g., a conditional parameter that includes a dynamic value or a value that varies over time). In some implementations, the conditional parameter may be associated with a previously recorded result of execution of the program.

In some implementations, the conditional parameter may include information and/or parameters associated with determining whether the condition is satisfied. For example, the conditional parameter may include information identifying the condition. As another example, the conditional parameter may include a baseline parameter that identifies a baseline value associated with execution of the program. As another example, the conditional parameter may include a tolerance parameter that identifies a tolerance value associated with execution of the program.

In some implementations, device 210 may determine the conditional parameter based on receiving the conditional parameter. For example, device 210 may determine the conditional parameter based on receiving the conditional parameter prior to execution of the program. As another example, device 210 may determine the conditional parameter based on receiving the conditional parameter in association with execution. As another example, device 210 may determine the conditional parameter based on receiving the conditional parameter in association with executing the program to generate the execution parameter.

In some implementations, when determining the conditional parameter, device 210 may receive the conditional parameter from a location different than the program. For example, device 210 may receive the conditional parameter from a different program file, a different program, or a different version of the program being used to generate the execution parameter. In some implementations, when determining the conditional parameter, device 210 may determine the conditional parameter based on receiving the conditional parameter from the different location.

Additionally, or alternatively, when determining the conditional parameter, device 210 may determine a correspondence between the conditional parameter and the generated execution parameter. For example, determining a correspondence between the conditional parameter and the execution parameter may include determining a correspondence between model blocks (e.g., execution blocks or blocks representing model operations) associated with the conditional parameter and model blocks associated with the execution parameter. As another example, determining a correspondence between the conditional parameter and the execution parameter may include determining a correspondence between signal identifiers that identify signals (e.g., time-varying quantities that have values at all points in time) associated with the conditional parameter and the execution parameter. As another example, determining a correspondence between the conditional parameter and the execution parameter may include using traceability information that indicates a correspondence between the conditional parameter and the execution parameter. In some implementations, the traceability information may include information stored with different program versions that enables tracing between the different program versions.

In some implementations, device 210 may execute a program to generate the execution parameter. For example, device 210 may generate an execution parameter that is associated with a result of execution of the program.

In this way, device 210 may determine a conditional parameter and may generate an execution parameter, thereby enabling device 210 to determine whether a condition is satisfied by comparing the conditional parameter and the execution parameter, as described in more detail below.

As further shown in FIG. 4, process 400 may include comparing the execution parameter and the conditional parameter (block 430) and determining that the condition is satisfied based on comparing the execution parameter and the conditional parameter (block 440). For example, device 210 may compare the execution parameter and the conditional parameter to produce a result of the comparison. In some implementations, device 210 may use the result of the comparison to determine whether the condition is satisfied.

In some implementations, when comparing the conditional parameter and the execution parameter, device 210 may compare values of the conditional parameter and the execution parameter. Additionally, or alternatively, device 210 may compare events (e.g., execution events) identified by the conditional parameter and the execution parameter.

Additionally, or alternatively, device 210 may compare states (e.g., states of a program or states of execution of the program) identified by the conditional parameter and the execution parameter. In some implementations, when comparing states, device 210 may compare a first state, associated with the conditional parameter and a second state, associated with the execution parameter. In some implementations, device 210 may determine whether the first state matches the second state based on comparing the first state and the second state and may determine whether the condition is satisfied based on determining whether the first state matches the second state.

In some implementations, device 210 may modify the conditional parameter and/or the execution parameter in association with comparing the conditional parameter and the execution parameter. For example, device 210 may shift values of the conditional parameter and/or the execution parameter in a time domain or a frequency domain. As another example, device 210 may perform an interpolation using the values of the conditional parameter and/or the execution parameter.

In some implementations, modifying the conditional parameter and/or the execution parameter may cause device 210 to generate a modified conditional parameter and/or a modified execution parameter. In some implementations, device 210 may compare the conditional parameter and the execution parameter using the modified conditional parameter and/or the modified execution parameter. This enables device 210 to determine a correspondence between the conditional parameter and the execution parameter, such as when the conditional parameter and the execution parameter have not been uniformly sampled during execution.

In some implementations, device 210 may compare the conditional parameter and the execution parameter in a domain. For example, device 210 may compare the conditional parameter and the execution parameter in a time domain. As another example, device 210 may compare the conditional parameter and the execution parameter in a frequency domain. This enables device 210 to compare a dynamic conditional parameter and a dynamic execution parameter, thereby improving testing of the program by increasing flexibility and/or control associated with the testing.

In some implementations, device 210 may determine whether the condition is satisfied based on comparing the execution parameter and the conditional parameter. For example, device 210 may determine that the condition is satisfied based on the conditional parameter not matching the execution parameter. As another example, device 210 may determine that the condition is satisfied based on an absolute difference between the execution parameter and a baseline parameter exceeding a tolerance parameter, exceeding a tolerance parameter by a threshold amount or by a threshold percentage.

As further shown in FIG. 4, process 400 may include performing an action, in association with the program, based on determining that the condition is satisfied (block 450). For example, device 210 may perform an action based on comparing the execution parameter and the conditional parameter. In some implementations, device 210 may perform the action when a result of comparing the execution parameter and the conditional parameter indicates that the condition is satisfied.

In some implementations, when performing the action, device 210 may pause execution of the program (e.g., based on determining that the condition is satisfied). For example, device 210 may pause execution by a first set of processors. In some implementations, device 210 may provide action information associated with the action (e.g. for display via a UI associated with device 210), based on pausing execution of the program.

Additionally, or alternatively, device 210 may continue execution of the program. For example, device 210 may continue execution by a second set of processors despite pausing execution by the first set of processors. This enables device 210 to simultaneously pause and continue execution, thereby increasing an efficiency of testing the program by reducing or eliminating a total interruption of execution when the condition is satisfied.

In some implementations, device 210 may perform another action based on the condition being satisfied. For example, device 210 may decrease a rate of execution of the program. As another example, device 210 may record a result of comparing the execution parameter and the conditional parameter (e.g., in a log of results), may continue execution of the program after recording the result, and may provide the log of results for display in association with recording the result. This improves testing by enabling the user to examine information associated with execution of the program without interrupting execution.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a device to use dynamic conditions (e.g., time-based conditional breakpoints or frequency-based conditional breakpoints) to trigger an action during execution of a program. This improves testing of the program by providing increased flexibility and/or control when defining conditions to trigger actions (e.g., relative to instructional breakpoints or conditional breakpoints).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining one or more conditional parameters associated with determining whether a dynamic conditional breakpoint is satisfied during execution of program code,
      the one or more conditional parameters including a dynamic value that varies over time,
      the dynamic conditional breakpoint triggering a change in a rate of execution of the program code when satisfied, and
      the determining being performed by one or more devices;
   executing the program code to generate one or more execution parameters corresponding to the one or more conditional parameters,
      the executing being performed by the one or more devices;
   comparing a value of the one or more execution parameters at a particular time and the dynamic value of the one or more conditional parameters at the particular time,
      the comparing being performed by the one or more devices;
   determining that the dynamic conditional breakpoint is satisfied at the particular time based on comparing the value of the one or more execution parameters and the dynamic value of the one or more conditional parameters,
      the determining being performed by the one or more devices; and
   changing the rate of execution of the program code for at least one of inspecting or debugging the program code based on determining that the dynamic conditional breakpoint is satisfied,
      the changing the rate of execution being performed by the one or more devices.

2. The method of claim 1, further comprising:
   providing action information, associated with the changing the rate of execution, for display based on changing the rate of execution.

3. The method of claim 1, where changing the rate of execution includes decreasing the rate of execution.

4. The method of claim 1, where the comparing comprises:
   comparing the value of the one or more execution parameters and dynamic value of the one or more conditional parameters in a time domain, or
   comparing the value of the one or more execution parameters and the dynamic value of the one or more conditional parameters in a frequency domain.

5. The method of claim 1, where the comparing comprises:
   modifying the one or more execution parameters or the one or more conditional parameters, to form one or more modified execution parameters or one or more modified conditional parameters, by at least one of:

shifting values of the one or more execution parameters or values of the one or more conditional parameters in a time domain, or performing interpolation using the values of the one or more execution parameters or the values of the one or more conditional parameters; and comparing the one or more execution parameters and the one or more conditional parameters using the one or more modified execution parameters or the one or more modified conditional parameters.

6. The method of claim 1, where the one or more conditional parameters include:

information identifying the dynamic conditional breakpoint, a baseline parameter identifying a baseline value associated with execution of the program code, or a tolerance parameter identifying a tolerance value associated with execution of the program code.

7. A non-transitory computer-readable medium storing instructions, the instructions comprising:

one or more instructions that, when executed by one or more processors, cause the one or more processors to:

determine at least one conditional parameter associated with determining whether a dynamic conditional breakpoint is satisfied during execution of program code, the at least one conditional parameter including at least one dynamic value that varies over time during execution of the program code, and the dynamic conditional breakpoint triggering a change in a rate of execution of the program code when satisfied;

execute the program code to generate at least one execution parameter corresponding to the at least one conditional parameter;

compare a value of the at least one execution parameter at a particular time and the dynamic value of the at least one conditional parameter in at least one domain at the particular time;

determine that the dynamic conditional breakpoint is satisfied at the particular time based on comparing the value of the at least one execution parameter and the at least one dynamic value of the at least one conditional parameter; and change the rate of execution of the program code for at least one of inspecting or debugging the program code based on determining that the dynamic conditional breakpoint is satisfied.

8. The non-transitory computer-readable medium of claim 7, where the one or more instructions further cause the one or more processors to:

provide action information, associated with the rate of execution, for display; and continue execution of the program code by a second set of processors.

9. The non-transitory computer-readable medium of claim 7, where the one or more instructions, that cause the one or more processors to change the rate of execution, cause the one or more processors to:

pause or stop execution of the program code based on determining that the dynamic conditional breakpoint is satisfied.

10. The non-transitory computer-readable medium of claim 7, where the at least one conditional parameter is received in association with execution of the program code or in association with executing the program code to generate the at least one execution parameter.

11. The non-transitory computer-readable medium of claim 7, where the one or more instructions, that cause the one or more processors to compare, cause the one or more processors to:

compare a first state of the program code, associated with the at least one execution parameter, and a second state of the program code, associated with the at least one conditional parameter; and where determining that the dynamic conditional breakpoint is satisfied comprises:

determine that the first state does not match the second state based on comparing the first state and the second state; and determine that the dynamic conditional breakpoint is satisfied based on determining that the first state does not match the second state.

12. The non-transitory computer-readable medium of claim 7, where the at least one conditional parameter is associated with a previously recorded result of execution of the program code.

13. The non-transitory computer-readable medium of claim 7, where the one or more instructions, that cause the one or more processors to compare, cause the one or more processors to:

modify the at least one execution parameter or the at least one conditional parameter, to form at least one modified execution parameter or at least one modified conditional parameter, by:

shifting values of the at least one execution parameter or values of the at least one conditional parameter in a time domain, or performing interpolation using the values of the at least one execution parameter or the values of the at least one conditional parameter; and compare the at least one execution parameter and the at least one conditional parameter using the at least one modified execution parameter or the at least one modified conditional parameter.

14. The non-transitory computer-readable medium of claim 7, where the one or more instructions further cause the one or more processors to:

provide run-time output for display based on executing the program code; and provide an indication, in association with the run-time output, that the dynamic conditional breakpoint is satisfied.

15. The non-transitory computer-readable medium of claim 7, where the at least one conditional parameter is associated with at least one model element based on traceability information.

16. The non-transitory computer-readable medium of claim 15, where the model element includes at least one of:

a variable, a signal, or a state.

17. The non-transitory computer-readable medium of claim 7, where the dynamic conditional breakpoint is determined based on input provided by a user.

18. A device, comprising:

one or more processors to:

determine a conditional parameter associated with determining whether a dynamic conditional breakpoint is satisfied during execution of program code, the conditional parameter including a dynamic value that changes over time, and the dynamic conditional breakpoint triggering a change in a rate of execution of the program code when satisfied;

execute the program code to generate an execution parameter corresponding to the conditional parameter;

compare a value of the execution parameter at a particular time and the dynamic value of the conditional parameter at the particular time in a time domain or in a frequency domain;

determine that the dynamic conditional breakpoint is satisfied based on comparing the value of the execution parameter and the dynamic value of the conditional parameter; and change the rate of execution of the program code for at least one of inspecting or debugging the program code based on determining that the dynamic conditional breakpoint is satisfied.

19. The device of claim 18, where the one or more processors are further to:

record a result of comparing the value of the execution parameter and the dynamic value of the conditional parameter in a log of results, the result indicating that the dynamic conditional breakpoint is satisfied;

continue execution of the program code; and provide the log of results for display in association with recording the result of comparing the value of the execution parameter and the dynamic value of the conditional parameter.

20. The device of claim 18, where the one or more processors, when determining the conditional parameter, are to:

receive the conditional parameter from a location different than the program code;

determine the conditional parameter based on receiving the conditional parameter; and determine a correspondence between the conditional parameter and the execution parameter by at least one of:

determining a correspondence between model blocks associated with the conditional parameter and model blocks associated with the execution parameter, determining a correspondence between signal identifiers that identify signals associated with the conditional parameter and signal identifiers that identify signals associated with the execution parameter, or using traceability information that indicates the correspondence between the conditional parameter and the execution parameter.

21. The device of claim 18, where the dynamic conditional breakpoint is a time-based conditional breakpoint or a frequency conditional breakpoint.

* * * * *